United States Patent [19]

Mahn, Jr.

[11] Patent Number: 5,635,001

[45] Date of Patent: Jun. 3, 1997

[54] TWILL DECORATIVE AND METHOD OF APPLYING

[75] Inventor: John Mahn, Jr., Cincinnati, Ohio

[73] Assignee: Specialty Adhesive Film Co., Cleves, Ohio

[21] Appl. No.: 210,608

[22] Filed: Mar. 18, 1994

[51] Int. Cl.$^6$ ................................................. B32B 7/08
[52] U.S. Cl. ................................. 156/93; 2/275; 156/290; 156/291; 156/299; 428/102; 112/475.04; 112/475.22; 112/475.09
[58] Field of Search ............................... 428/40, 102, 914, 428/214, 90; 112/262.1, 265.1, 266.1; 2/275; 156/230, 241, 93, 290, 291, 299

[56] References Cited

U.S. PATENT DOCUMENTS

| | | | |
|---|---|---|---|
| 3,853,595 | 12/1974 | Pedginski | 428/156 |
| 4,365,355 | 12/1982 | Off | 2/247 |
| 4,549,916 | 10/1985 | Off | 156/93 |
| 4,717,621 | 1/1988 | So et al. | 428/349 |
| 5,047,103 | 9/1991 | Abrams | 156/72 |
| 5,207,851 | 5/1993 | Abrams | 156/230 |
| 5,346,746 | 9/1994 | Abrams | 428/195 |

FOREIGN PATENT DOCUMENTS 5-33205  2/1993  Japan.

*Primary Examiner*—Nasser Ahmad

[57] ABSTRACT

Cloth transfers such as twill numbers and letters include a cloth layer coated with a plastic layer which is, in turn, coated with a pressure sensitive adhesive layer. The intermediate plastic layer permits the cloth transfer to be temporarily bonded to a cloth substrate by a very thin film of pressure sensitive adhesive as it is sewn onto the substrate. The intermediate plastic layer prevents the sewing needle from being gummed up with the pressure sensitive adhesive.

1 Claim, 1 Drawing Sheet

TWILL DECORATIVE AND METHOD OF APPLYING

BACKGROUND OF THE INVENTION

There are a variety of different decoratives which are applied to various cloth surfaces. These decoratives are used in a variety of ways to provide information and decorative indicia upon cloth substrates. These transfers can vary depending upon the particular method of applying the transfer onto a cloth substrate, and can vary depending upon the indicia-bearing layer.

Cloth, specifically twill, is frequently used to apply lettering and numbers to jackets, jerseys and the like. Also, embroidered emblems are sewn onto shirts and caps. These are generally not heat bonded to the cloth substrate, but are simply sewn onto the cloth substrate.

When applying twill letters to a substrate, they tend to move. Thus, properly aligning these becomes difficult. This is a problem encountered with heat activated transfers. So U.S. Pat. No. 4,717,621 discloses a method to overcome this problem. It specifically discloses applying a pressure sensitive adhesive to a thermoplastic layer of a heat activated transfer. This allows the heat activated transfer to be temporarily adhered to the substrate without heat.

This has been attempted with twill lettering, but does not work. Generally, to use a pressure sensitive adhesive to bond twill to a cloth substrate requires a relatively thick layer of the pressure sensitive adhesive—generally in the neighborhood of 1 mil or more. When sewing this to the cloth substrate, the needle and thread are gummed up with the pressure sensitive adhesive, interfering with the application to the cloth substrate. Even when less than 1 mil is applied, this presents a significant problem.

SUMMARY OF THE INVENTION

Accordingly, it is an object of the present invention to provide a cloth transfer such as an emblem or twill letter which can be applied to a cloth substrate with a pressure sensitive adhesive which does not interfere with the sewing of the transfer onto the cloth substrate. The objective of the present invention is achieved by forming a cloth transfer with a polymeric backing layer, such as a thermoplastic layer, bonded to the back side of the decorative, and subsequently coating this backing layer with a pressure sensitive adhesive. The pressure sensitive adhesive is then covered with a release sheet. The decoratives formed from this material can then be sewn onto a cloth substrate. The plastic backing layer on the transfer actually cleans the needle, preventing it from being gummed up with the pressure sensitive adhesive. This also permits a relatively thin layer of pressure sensitive adhesive—in the neighborhood of less than 1 mil, as low as 0.25 mil—to be used to adequately bond the decorative to the cloth substrate.

This transfer also has the added advantage of making it easier to cut out lettering and numbering from a coated twill surface because it also holds threads together. This also provides a clean cut without frayed edges. Finally, once applied to a cloth substrate, the polymeric layer decreases shrinkage of the twill lettering.

The objects and advantages of the present invention will be further appreciated in light of the following detailed descriptions and drawings in which:

DETAILED DESCRIPTION

Figure 1:
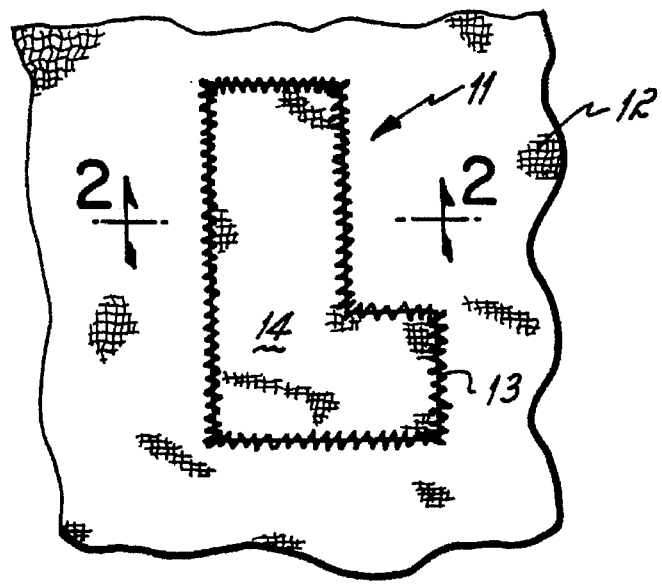
FIG. 1 is an overhead view of a decorative formed according to the present invention.
Figure 2:
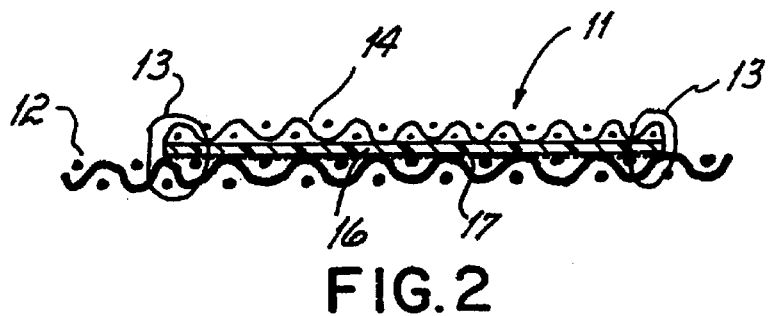
FIG. 2 is a cross-sectional view taken at lines 2—2 of FIG. 1.
Figure 3:
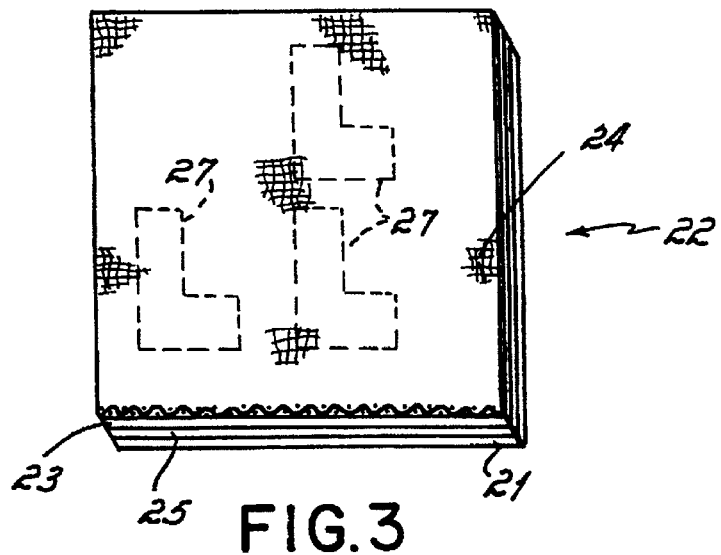
FIG. 3 is a perspective view of material used to form decoratives according to the present invention.

The present invention is a cloth decorative or transfer 11 which is bonded to a cloth substrate 12 with stitching 13. The transfer 11 includes a woven layer 14 which is coated on its lower surface with a plastic film 16. Plastic film 16, in turn, is coated with a pressure sensitive adhesive layer 17. As shown in FIG. 3, the pressure sensitive adhesive layer is, in turn, covered with a release sheet 21.

The woven layer can be any cloth layer, including various fabrics and emblems which are designed to be sewn onto a cloth substrate. Preferably, this substrate is twill. However, using the present invention will permit the use of other thinner weaves because the plastic backing layer provides added strength.

The decoratives of the present invention can be manufactured in a variety of different manners. One such manner is shown in FIG. 3. The laminate 22 shown in FIG. 3 is formed by bonding a plastic layer 23 to the back surface of a cloth or woven sheet 24. In turn, this is coated with the pressure sensitive adhesive layer 25, which is, in turn, covered with the release sheet 21. The indicia are then cut out, as shown by dashed lines 27 to form the transfer 11.

The polymeric film 16 is a non-tacky plastic film, preferably a thermoplastic adhesive layer. It can be a thermoset layer, as long as it adequately bonds to the back side of the twill layer. However, thermoplastic adhesive is preferred. Suitable thermoplastic adhesive layers include, for example, polyurethane adhesives such as Morton Company brand PS27, polyester adhesives such as Bostik polyester thermoplastic adhesive, as well as mixtures of polyester and polyurethane thermoplastic adhesives. Polyamide adhesives can also be employed, such as EMS-1-G. The polymeric film should have a film thickness of from about 0.5 mil to about 7 mil, with about 1 mil being preferred. However, lesser amounts can be employed, depending upon the particular polymer employed.

The pressure sensitive adhesive layer can be any pressure sensitive adhesive that will adequately bond the plastic film layer 16 to the cloth surface 12. Two suitable pressure sensitive adhesives which can be used in the present invention are B-95 Pressure Sensitive Adhesive sold by JDC, Inc. of Mount Juliet, Tenn., and A-100, also sold by JDC, Inc. Bostik 10-610-2 Hot Melt Pressure Sensitive Adhesive will also function in the present invention. Preferably, the pressure sensitive adhesive will be relatively hard, having a hardness of 50 to about 150 shore A. This decreases any likelihood that the needle will become fouled with the pressure sensitive adhesive.

Again, the pressure sensitive adhesive layer should be relatively thin—generally from about 0.25 to about 1 mil with about 0.5 mil being preferred. It can be applied in discrete locations, but it is preferably a continuous film.

The cloth decorative of the present invention will also include a liner or release sheet (layer 21 of FIG. 3) which can be, for example, polyethylene terapthalate or silicon-coated densified Kraft paper, or other typical release sheets. The decorative of the present invention is applied to a cloth substrate 12 by simply removing the release sheet, positioning it on the cloth substrate at the desired location. The pressure sensitive adhesive will then hold the decorative in the desired position. If off center, these can be moved to the proper location. The peripheral edges of the decorative are then sewn onto the cloth substrate with stitching 13.

Where the plastic film 16 is a thermoplastic adhesive, it is also possible to thermoplastically bond the decorative to the cloth substrate 12. However, there is no reason to do so. Accordingly, generally the central portions of the lettering surrounded by the stitching 13 are not bonded to the cloth substrate except temporarily by the pressure sensitive adhesive.

The decorative of the present invention temporarily adheres to the cloth because of the pressure sensitive adhesive. The plastic layer, however, prevents the needle from being gummed up as it sews the decorative onto the surface. Further, this plastic layer decreases shrinkage of the twill lettering. Finally, the plastic layer also makes it easier to cut the individual letters or indicia from the material once they have been laminated.

This has been a description of the present invention, along with many of the advantages of the present invention. However, the invention itself should only be defined by the appended claims wherein

I claim:

1. A method of applying cloth indicia to a cloth substrate wherein said cloth indicia comprises a cloth layer bonded to a thermoplastic adhesive layer, in turn bonded to a pressure sensitive adhesive layer, wherein said indicia is applied to said cloth substrate by pressing said pressure sensitive adhesive layer against said cloth substrate to temporarily bond said cloth indicia to said cloth substrate, sewing an entire peripheral portion of said cloth indicia to said cloth substrate by applying stitching with a needle through said cloth indicia and said thermoplastic adhesive layer and through said pressure sensitive adhesive layer whereby said thermoplastic adhesive layer prevents pressure sensitive adhesive from gumming up said needle.

* * * * *